US007929083B2

(12) United States Patent
Teramoto (10) Patent No.: US 7,929,083 B2
(45) Date of Patent: Apr. 19, 2011

(54) LIQUID CRYSTAL DISPLAY DEVICE INCLUDING A TRANSPARENT ELEMENT AND A REFLECTIVE ELEMENT WITH A RETARDATION FILM

(75) Inventor: Masahiro Teramoto, Mobara (JP)

(73) Assignee: Hitachi Displays, Ltd., Chiba-ken (JP)

( * ) Notice: Subject to any disclaimer, the term of this patent is extended or adjusted under 35 U.S.C. 154(b) by 606 days.

(21) Appl. No.: 11/896,586

(22) Filed: Sep. 4, 2007

(65) Prior Publication Data

US 2008/0062362 A1 Mar. 13, 2008

(30) Foreign Application Priority Data

Sep. 11, 2006 (JP) ................................ 2006-244970

(51) Int. Cl.
*G02F 1/1335* (2006.01)
*G02F 1/1333* (2006.01)
(52) U.S. Cl. ..................... 349/114; 349/117; 349/122
(58) Field of Classification Search .................. 349/114, 349/117, 122
See application file for complete search history.

(56) References Cited

U.S. PATENT DOCUMENTS

| 7,456,916 B2* | 11/2008 | Kaneko .......................... 349/114 |
| 2004/0004681 A1* | 1/2004 | Ozawa et al. ................... 349/61 |
| 2007/0064183 A1* | 3/2007 | Huang et al. ................... 349/114 |
| 2007/0085948 A1* | 4/2007 | Kim et al. ...................... 349/114 |
| 2007/0195235 A1* | 8/2007 | Chang et al. ................... 349/114 |

FOREIGN PATENT DOCUMENTS

JP 2005-338256 5/2004

* cited by examiner

*Primary Examiner* — David Nelms
*Assistant Examiner* — Nathanael R Briggs
(74) *Attorney, Agent, or Firm* — Stites & Harbison, PLLC; Juan Carlos A. Marquez, Esq (57) ABSTRACT

A subject of the present invention is to prevent damage to a retardation film, etc. to improve the reliability in a liquid crystal display device including a retardation film on the side of the color filter substrate.

To solve the problem, there is provided a liquid crystal display device comprising a liquid crystal display panel which includes a pair of substrates and liquid crystal supported between the pair of substrates, wherein the liquid crystal display panel includes a plurality of sub-pixels; each of the plurality of sub-pixels includes a transparent element and a reflective element; and one substrate of the pair of substrates includes: a diffuse reflection layer formed at a position corresponding to the reflective element of each individual sub-pixel, an oriented film formed on the diffuse reflection layer, a retardation film formed in a region in which the diffuse reflection layer is formed on the oriented film, a color filter formed on the retardation film, and a planarizing film formed on the color filter.

8 Claims, 8 Drawing Sheets

LIGHT (b)

LIQUID CRYSTAL DISPLAY DEVICE INCLUDING A TRANSPARENT ELEMENT AND A REFLECTIVE ELEMENT WITH A RETARDATION FILM

CLAIM OF PRIORITY

The present application claims priority from Japanese Application JP 2006-244970 filed on Sep. 11, 2006, the content of which is hereby incorporated by reference into this application.

BACKGROUND OF THE INVENTION

1. Field of the Invention

The present invention relates to a liquid crystal display device. More particularly, the present invention relates to a semi-transparent liquid crystal display device including a retardation film on the side of a color filter substrate.

2. Description of the Related Art

A semi-transparent liquid crystal display device including a transparent element and a reflective element in a single sub-pixel is used as a display for portable device.

Figure 18:
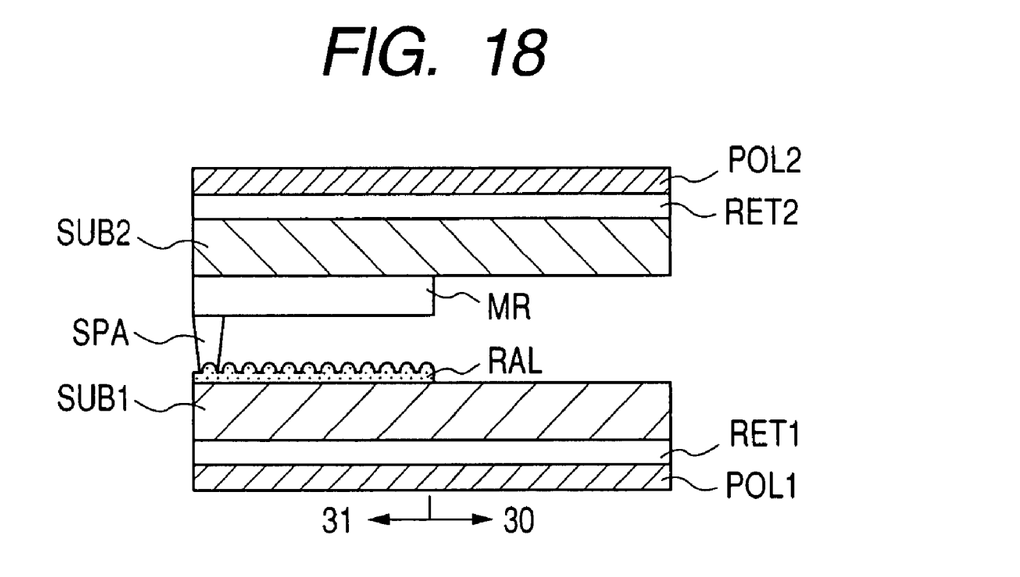
FIG. 18 is a principal part sectional view showing an outline configuration of a single sub-pixel of a conventional IPS-based semi-transparent liquid crystal display device.
Figure 19:
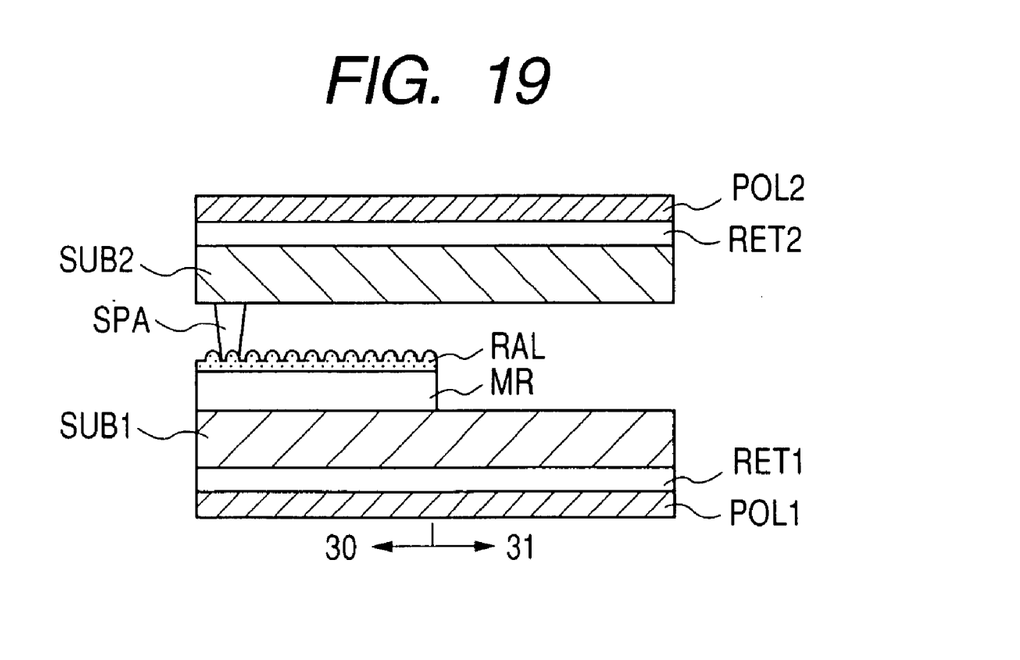
FIG. 19 is a principal part sectional view showing an outline configuration of a single sub-pixel of a conventional IPS-based semi-transparent liquid crystal display device.

FIG. 18 and FIG. 19 are principal part sectional views showing an outline configuration of a single sub-pixel of a conventional IPS-based semi-transparent liquid crystal display device.

In FIG. 18 and FIG. 19, SUB1 denotes a glass substrate (also referred to as TFT substrate) on which a thin-film transistor constituting an active element, a pixel electrode, an opposing electrode (not shown), etc. are formed; SUB2, a glass substrate (also referred to as color filter substrate) on which a color filter, a black matrix, etc. are formed; MR, a gap adjustment layer; RAL, a diffuse reflection layer having an irregular surface; SPA, a columnar spacer; POL1 and POL2, polarizing plates; and RET1 and RET2, retardation plates.

Reference numeral 30 denotes a transparent element, and 31, a reflective element. The cell gap length of the reflective element 31 is set to about a half of that of the transparent element 30 by means of a gap adjustment layer (MR) in order to set almost the same optical path length both for the transparent element 30 and the reflective element 31 because light passes twice (in forward and return paths) through the reflective element 31.

With the semi-transparent liquid crystal display device shown in FIG. 18, an adjustment layer (MR) is formed on the side of the glass substrate (SUB2). With the semi-transparent liquid crystal display device shown in FIG. 19, a gap adjustment layer (MR) is formed on the side of the glass substrate (SUB1). With the semi-transparent liquid crystal display devices shown in FIG. 18 and FIG. 19, the main surface side of the glass substrate (SUB2) is the observation side.

With the conventional IPS-based semi-transparent liquid crystal display device, polarizing plates (POL1, POL2) with built-in retardation plates (RET1, RET2) are used as shown in FIG. 18 and FIG. 19, and therefore the retardation plates (RET1, RET2) also affect the light which penetrates through the transparent element 30, adversely affecting the optical characteristics and causing a problem that it is difficult to make the optical characteristics of the transparent element 30 and the reflective element 31 compatible with each other.

The following device is known to solve the above-mentioned problem: an IPS-based semi-transparent liquid crystal display device which includes a built-in retardation plate only in the reflective element 31 on the side of the glass substrate (SUB2) (refer to JP-A-2005-338256).

JP-A-2005-338256 discloses a technique related to the invention of the present application.

SUMMARY OF THE INVENTION

With a conventional IPS-based semi-transparent liquid crystal display device, polarizing plates with built-in retardation plates are used and therefore the transparent element also includes retardation plates, adversely affecting the optical characteristics and causing a problem that it is difficult to make the optical characteristics of the transparent element 30 and the reflective element 31 compatible with each other. With the semi-transparent liquid crystal display device disclosed in JP-A-2005-338256, however, built-in retardation plates are included on the side of the glass substrate (SUB2), making it possible to satisfy the optical characteristics of both the transparent element and the reflective element.

However, with the configuration disclosed in JP-A-2005-338256, it is assumed that the built-in retardation plates are damaged by subsequent manufacturing processes, degrading the reliability of the semi-transparent liquid crystal display device.

Furthermore, there arose a problem that, if a diffuse reflection layer was formed on the side of the glass substrate (SUB1), the cell gap length became uneven because of irregular surface shape degrading the display characteristics.

The present invention was performed in order to solve problems of the above-mentioned conventional technology. An object of the present invention is to provide a technology which makes it possible to prevent damage to a retardation film, etc. in a liquid crystal display device including a retardation film on the side of the color filter substrate to improve the reliability.

Furthermore, another object of the present invention is to form a diffuse reflection layer on the side of the color filter substrate, in a liquid crystal display device including a retardation film on the side of the color filter substrate, to provide a technology which makes it possible to prevent the degradation of the display characteristics.

The above-mentioned and other objects of the present invention, and new features thereof will be explained by the following descriptions and with reference to the accompanying drawings.

Of pieces of invention disclosed in the present application, typical ones will briefly be explained below.

(1) A liquid crystal display device comprising a liquid crystal display panel which includes a pair of substrates and liquid crystal supported between the pair of substrates, wherein the liquid crystal display panel includes a plurality of sub-pixels; each of the plurality of sub-pixels includes a transparent element and a reflective element; one substrate of the pair of substrates includes a diffuse reflection layer formed at a position corresponding to the reflective element of each individual sub-pixel; the other substrate of the pair of substrates includes a pixel electrode; and the surface of the other substrate on the side opposite to the liquid crystal is a display surface.

(2) A liquid crystal display device comprising a liquid crystal display panel which includes a pair of substrates and liquid crystal supported between the pair of substrates, wherein the liquid crystal display panel includes a plurality of sub-pixels; each of the plurality of sub-pixels includes a transparent element and a reflective element; and one substrate of the pair of substrates includes a diffuse reflection layer formed at a position corresponding to the reflective element of each individual sub-pixel, an oriented film formed on the diffuse reflection layer, a retardation film formed in a region in which the diffuse reflection layer is formed on the oriented film, a color filter formed on the retardation film, and a planarizing film on the color filter.

(3) A liquid crystal display device according to (2), wherein the oriented film is formed only in a region in which the diffuse reflection layer is formed.

(4) A liquid crystal display device according to (2) or (3), including a gap adjustment layer formed on the planarizing film.

(5) A liquid crystal display device comprising a liquid crystal display panel which includes a pair of substrates and liquid crystal supported between the pair of substrates, wherein the liquid crystal display panel includes a plurality of sub-pixels; each of the plurality of sub-pixels includes a transparent element and a reflective element; and one substrate of the pair of substrates includes a diffuse reflection layer formed at a position corresponding to the reflective element of each individual sub-pixel, a color filter formed on the diffuse reflection layer, an oriented film formed on the color filter, a retardation film formed in a region in which the diffuse reflection layer is formed on the oriented film, and a protection film formed on the retardation film.

(6) A liquid crystal display device according to (5), including a planarizing film formed on the color filter, wherein the oriented film is formed on the planarizing film.

(7) A liquid crystal display device according to (5) or (6), wherein the oriented film is formed only in a portion in which the diffuse reflection layer is formed.

(8) A liquid crystal display device according to (6) or (7), wherein the planarizing film acts also as the oriented film.

(9) A liquid crystal display device according to any one of (5) to (8), including a gap adjustment layer formed on the protection film.

(10) A liquid crystal display device according to (4) or (9), including a columnar spacer formed on the gap adjustment layer.

(11) A liquid crystal display device according to any one of (1) to (10), wherein the retardation film is composed of a polymer liquid crystal material.

(12) A liquid crystal display device according to any one of (2) to (11), wherein the other substrate of the pair of substrates includes a pixel electrode and an opposing electrode, and the surface of the other substrate on the side opposite to the liquid crystal is a display surface.

(13) A liquid crystal display device according to (12), wherein an interlayer insulating film is formed on the opposing electrode, and the pixel electrode is formed on the interlayer insulating film.

(14) A method of manufacturing a liquid crystal display device comprising a liquid crystal display panel which includes a pair of substrates and liquid crystal supported between the pair of substrates, wherein the liquid crystal display panel includes a plurality of sub-pixels; each of the plurality of sub-pixels includes a transparent element and a reflective element; and one substrate of the pair of substrates includes a diffuse reflection layer formed at a position corresponding to the reflective element of each individual sub-pixel, an oriented film formed on the diffuse reflection layer, and a retardation film formed in a region in which the diffuse reflection layer is formed on the oriented film; the method comprising the steps of: patterning the diffuse reflection layer; forming an oriented film on the diffuse reflection layer; and forming a patterned retardation film by forming a positive resist for retardation film on the oriented film and then applying irradiation light from the side of the diffuse reflection layer to eliminate exposed sections irradiated with light.

Effect obtained by typical pieces of invention disclosed in the present application will briefly be explained below.

(1) In accordance with the present invention, it is possible, in a liquid crystal display device including a retardation film on the side of the color filter substrate, to prevent damage to the retardation film, etc. to improve the reliability.

(2) In accordance with the present invention, it is possible, in a liquid crystal display device including a retardation film on the side of the color filter substrate, to prevent the degradation of the display characteristics by forming a diffuse reflection layer on the side of the color filter substrate.

BRIEF DESCRIPTION OF THE DRAWINGS

FIGS. 2B(a) 2B(b) are diagrams illustrating a method of manufacturing the glass substrate (SUB2) shown in FIG. 1A.

DETAILED DESCRIPTION OF PREFERRED EMBODIMENTS

An embodiment of the present invention will be explained in detail below with reference to the accompanying drawings.

In all Figures used to describe the embodiment, an element having the same function is assigned the same reference numeral, and duplicated explanation will be omitted.

Figure 1A:
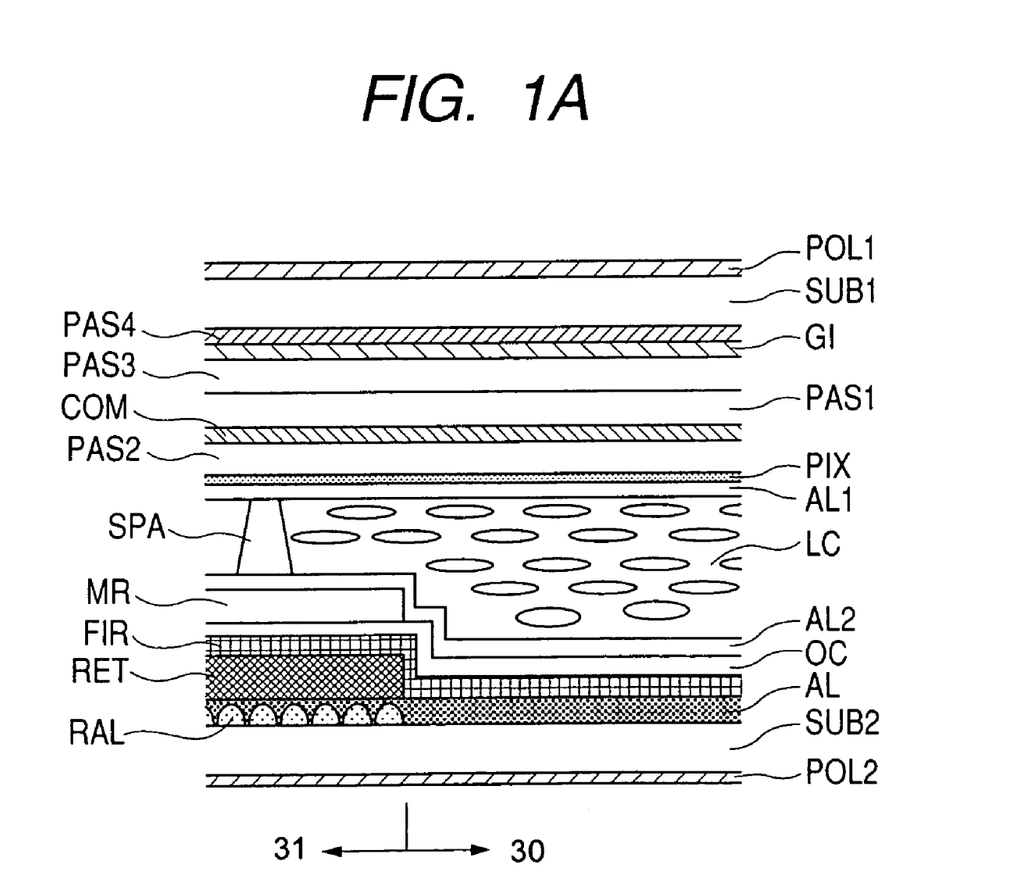
FIG. 1A is a principal part sectional view showing a cross-sectional structure of a single sub-pixel of a semi-transparent liquid crystal display device according to the embodiment of the present invention.
Figure 1B:
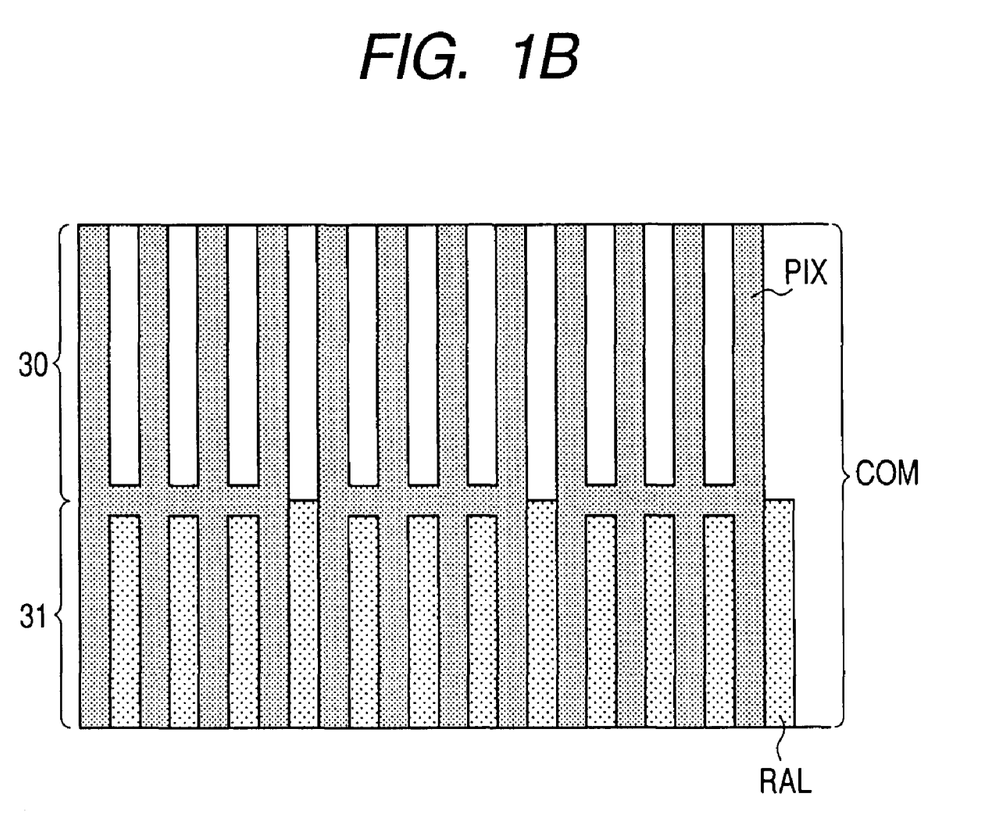
FIG. 1B is a plan view illustrating an electrode structure of a semi-transparent liquid crystal display device according to the embodiment of the present invention.

FIG. 1A is a principal part sectional view showing the cross-sectional structure of a single sub-pixel of the semi-transparent liquid crystal display device according to the embodiment of the present invention. FIG. 1B is a plan view illustrating an electrode structure of the semi-transparent liquid crystal display device according to the embodiment of the present invention.

In the semi-transparent liquid crystal display device according to the present embodiment, a pair of glass substrates (SUB1, SUB2) are implemented so as to sandwich a liquid crystal layer (LC). With the semi-transparent liquid crystal display device according to the present embodiment, the main surface side of the glass substrate (SUB1) is the observation side.

On the side of the liquid crystal layer of the glass substrate (SUB1, also referred to as TFT glass substrate), an insulating film (PAS4), a gate insulating film (GI), a scanning line (also referred to as gate line, not shown) (GL), an interlayer insulating film (PAS3), an image line (also referred to as source line or drain line, not shown) (DL), an interlayer insulating film (PAS1), an opposing electrode (COM, also referred to as common electrode), an interlayer insulating film (PAS2), a pixel electrode (PIX), and an oriented film (AL1) are formed in this order from the glass substrate (SUB1) to the liquid crystal layer (LC) A polarizing plate (POL1) is formed outside the glass substrate (SUB1).

On the side of the liquid crystal layer of the glass substrate (SUB2, also referred to as color filter substrate), a diffuse reflection layer (RAL), an oriented film (AL) for built-in retardation film, a built-in retardation film (RET), an RGB color filter (FIR), a planarizing film (OC), a gap adjustment layer (MR), and an oriented film (AL2) are formed in this order from the glass substrate (SUB2) to the liquid crystal layer (LC). A polarizing plate (POL2) is formed outside of the glass substrate (SUB2).

Furthermore, as shown in FIG. 1B, the opposing electrode (COM) is formed in planar form, and the pixel electrode (PIX) and the opposing electrode (COM) are overlapped through the interlayer insulating film (PAS2), the pixel electrode (PIX) and the opposing electrode (COM) being formed by a transparent conductive film made of, for example, ITO (Indium Tin Oxide), thus forming the retention volume. The number of layers of the interlayer insulating film (PAS2) is not limited to one, but there may be a plurality of layers thereof.

With the present embodiment, the diffuse reflection layer (RAL) is formed on the side of the glass substrate (SUB2). A region in which the diffuse reflection layer (RAL) is formed is a reflective element 31 at which the light entering from the glass substrate (SUB1) side is diffused and reflected by the diffuse reflection layer (RAL) in a direction different from the incidence direction.

Furthermore, a region in which the diffuse reflection layer (RAL) is not formed is a transparent element 30. Irradiation light from the back light arranged on the reverse side of the glass substrate (SUB2) passes through the transparent element 30 and then emitted from the main surface side of the glass substrate (SUB1).

The diffuse reflection layer (RAL) may be an aluminum (Al) metal film or a two-layer structure including molybdenum (Mo) as a lower layer and aluminum (Al) as an upper layer.

Also with the semi-transparent liquid crystal display device according to the present embodiment, the pixel electrode (PIX) and the planar opposing electrode (COM) are laminated through the interlayer insulating film (PAS2), and arch-shaped electric flux lines formed between the pixel electrode (PIX) and the opposing electrode (COM) are distributed so as to penetrate through the liquid crystal layer (LC) to change the orientation of the liquid crystal layer (LC).

In accordance with the present embodiment, although the glass substrates (SUB1 and SUB2) are set to a predetermined gap length by the columnar spacer (SPA), the cell gap length of the reflective element 31 is set to about a half of the cell gap length of the transparent element 30 by the gap adjustment layer (MR), in order to set almost the same optical path length both for the transparent element 30 and the reflective element 31 because light passes twice (in forward and return paths) through the reflective element 31.

The transparent element 30 displays the contrast of light by use of the birefringence characteristic of the liquid crystal layer (LC), while the reflective element 31 displays the contrast of light by use of the birefringence characteristic of the built-in retardation film (RET) and the liquid crystal layer (LC) arranged in the liquid crystal display panel.

Figure 2A:
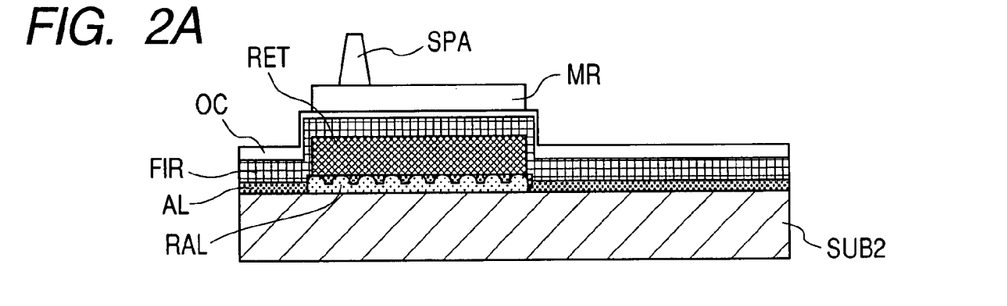
FIG. 2A is a diagram showing only a configuration on the side of the glass substrate (SUB2) shown in FIG. 1A.
Figure 2B:
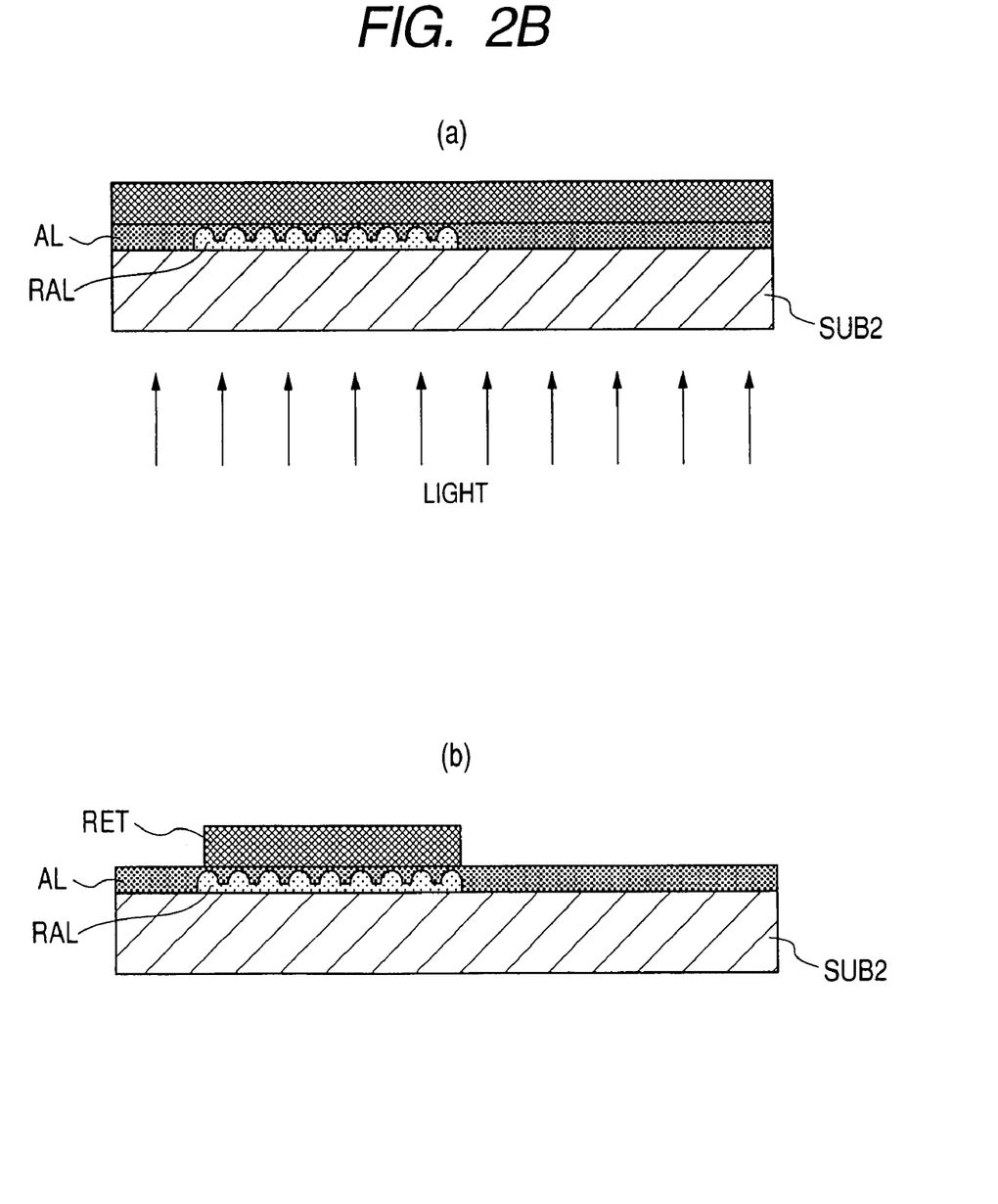

FIG. 2A is a diagram showing only a configuration on the side of the glass substrate (SUB2) shown in FIG. 1A. FIGS. 2-2A and 2-2B are diagrams illustrating a method of manufacturing the glass substrate (SUB2) shown in FIG. 1A.

In accordance with the present embodiment, the glass substrate (SUB2) shown in FIG. 1 is formed with the following methods.

As shown in FIG. 2B(a), the diffuse reflection layer (RAL) is formed on the glass substrate (SUB2). The diffuse reflection layer (RAL) is formed by use of, for example, a well-known photo-etching method.

Then, an oriented film (AL) for built-in retardation film is formed on the diffuse reflection layer (RAL) and then orientation processing is performed to the oriented film (AL) through the rubbing method. Here, the oriented film (AL) is provided with a function to determine the phase-lag axis direction of the built-in retardation film (RET).

Then, a positive resist for retardation film is formed on the oriented film (AL), and the resist is irradiated with light (ultraviolet light) from below the diffuse reflection layer (RAL) to dissolve exposed sections into organic solvent for development, thus forming a built-in retardation film (RET) patterned with the same pattern as the diffuse reflection layer (RAL), as shown in FIG. 2B(b).

Specifically, organic solvent containing liquid crystal including a photosensitive acrylic group at the end of molecule is applied onto the oriented film (AL) and then heated to eliminate organic solvent. At this time, the photosensitive liquid crystal is oriented in the direction of orientation processing of the oriented film (AL). Then, using a pattern of the diffuse reflection layer (RAL), only the portions not irradiated with ultraviolet light because of the diffuse reflection layer (RAL) are left to form the built-in retardation film (RET).

Subsequently, the color filter (FIR), the planarizing film (OC), the gap adjustment layer (MR), and the oriented film (AL2) are formed.

As the organic solvent, acetone, cyclohexanone, cyclopentanone, cycloheptanone, propylene glycol methyl ether acetate, and lower alcohol, such as methanol, ethanol, propanol, butanol, etc. can be used independently or in combination. In particular, cyclohexanone, cyclopentanone, and propylene glycol methyl ether acetate are preferable.

In accordance with the present embodiment, as explained above, the diffuse reflection layer (RAL) was formed on the side of the glass substrate (SUB2) and the glass substrate (SUB1) side is used as a display surface, making it possible to eliminate the influence on the cell gap, make a uniform gap, and improve the optical characteristics.

Furthermore, since the built-in retardation film (RET) can selectively be formed only in the reflective element 31 by use of the pattern of the diffuse reflection layer (RAL), it becomes possible to make the transmission characteristics of the transparent element 30 compatible with the reflective efficiency of the reflective element 31.

Specifically, since the present embodiment makes it possible to make the optical characteristics of the transparent element 30 and the reflective element 31 compatible with each other, and further eliminate the need to build the retardation plates (RET1, RET2) in the polarizing plates (POL1, POL2), it becomes possible to reduce the thickness of a product.

Furthermore, since the color filter (FIR) and the planarizing film (OC) are formed on the built-in retardation film (RET) and the oriented film (AL), it is possible to make the built-in retardation film (RET) corrosion-proof as well as obtain the effect of preventing coloring and decomposition of the oriented film caused by irradiation of UV or DUV in the exposure process when forming the columnar spacer (SPA), by use of the existing films.

Furthermore, since the built-in retardation film (RET) can be formed without masking by use of the pattern of the diffuse reflection layer (RAL) by performing back exposure in combination with the positive resist for retardation film, it is possible to realize cost reduction in multiproduct small-volume production.

Furthermore, by using the glass substrate (SUB1) side as a display surface and utilizing the electrode pattern as a light shielding film (BM) through a method of, for example, antireflection processing to the electrode on the side of the glass substrate (SUB1), it becomes unnecessary to form a light shielding film (BM) for light shielding making it possible to eliminate the light shielding film (BM).

Figure 3:
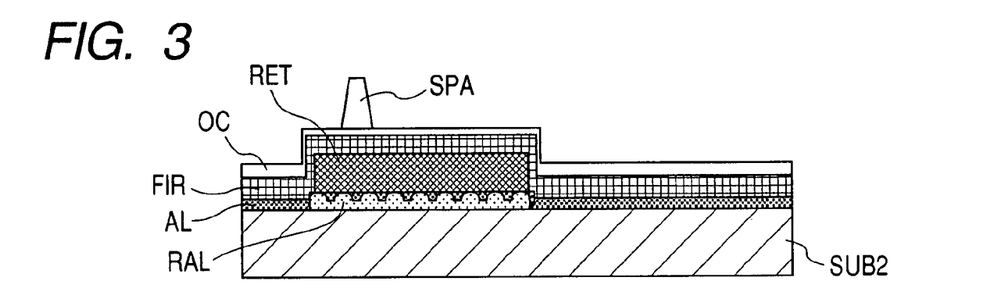
FIG. 3 is a diagram showing a configuration of a variation 1 on the side of the glass substrate (SUB2) shown in FIG. 2A.

FIG. 3 is a diagram showing a configuration of a variation 1 on the side of the glass substrate (SUB2) shown in FIG. 2A. With the variation 1 shown in FIG. 3, the gap adjustment layer (MR) is not provided in the structure of the embodiment. If adjustment of the gap length of the reflective element 31 is not necessary because of the product structure or material selection, for example, a design that suits the gap length of the built-in retardation film (RET), the gap adjustment layer (MR) become unnecessary, making it possible to omit the gap adjustment layer (MR) and accordingly reduce the number of processes with the variation 1 shown in FIG. 3.

Figure 4:
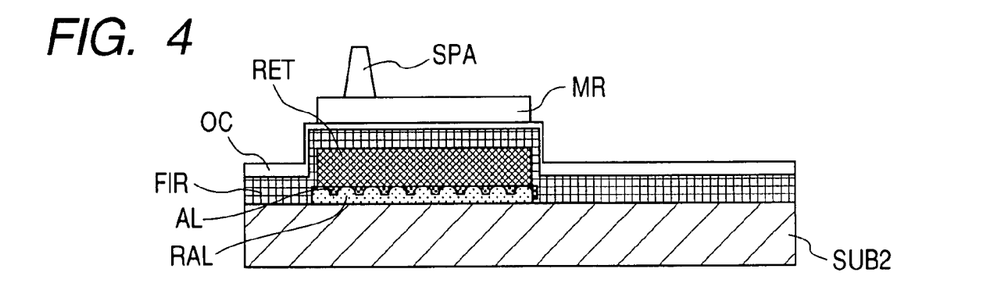
FIG. 4 is a diagram showing a configuration of a variation 2 on the side of the glass substrate (SUB2) shown in FIG. 2A.

FIG. 4 is a diagram showing a configuration of a variation 2 on the side of the glass substrate (SUB2) shown in FIG. 2A. With the variation 2 shown in FIG. 4, the oriented film (AL) is formed only in the reflective element 31 in the structure of the embodiment. The variation 2 thereby makes it possible to improve the transmission characteristics.

Figure 5:
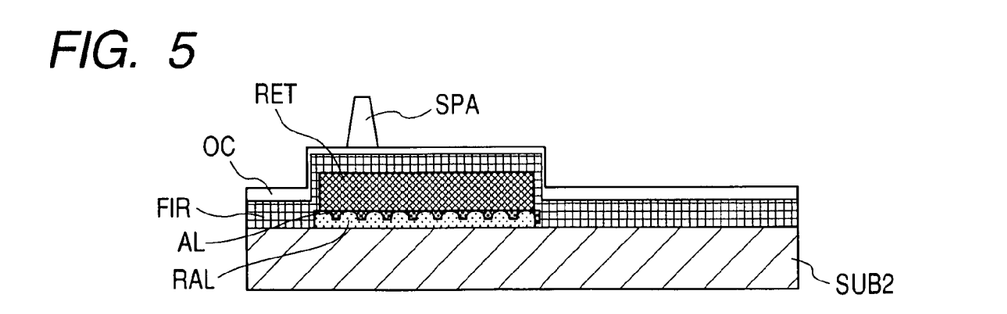
FIG. 5 is a diagram showing a configuration of a variation 3 on the side of the glass substrate (SUB2) shown in FIG. 2A.

FIG. 5 is a diagram showing a configuration of a variation 3 on the side of the glass substrate (SUB2) shown in FIG. 2A. The variation 3 shown in FIG. 5 is a simplified structure applied when the gap adjustment of the reflective element 31 is not required, wherein the gap adjustment layer (MR) is not provided in the structure of the variation 2.

Figure 6:
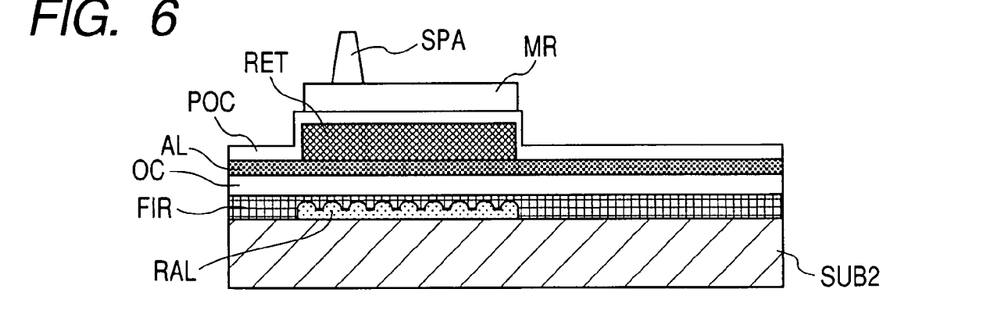
FIG. 6 is a diagram showing a configuration of a variation 4 on the side of the glass substrate (SUB2) shown in FIG. 2A.

FIG. 6 is a diagram showing a configuration of a variation 4 on the side of the glass substrate (SUB2) shown in FIG. 2A. With the variation 4 shown in FIG. 6, the color filter (FIR) and the planarizing film (OC) are formed before forming the built-in retardation film (RET). Then, after forming the oriented film (AL) and the built-in retardation film (RET), the transparent resin protection layer (POC) is formed on the oriented film (AL) and the built-in retardation film (RET). Furthermore, the gap adjustment layer (MR) is formed on the transparent resin protection layer (POC) and further the columnar spacer (SPA) on the gap adjustment layer (MR).

If a restriction on the formation of the color filter (FIR) arises because of the built-in retardation film (RET), the variation 4 is effective for ensuring the characteristics equivalent to the embodiment, but process advantages will be lost.

Figure 7:
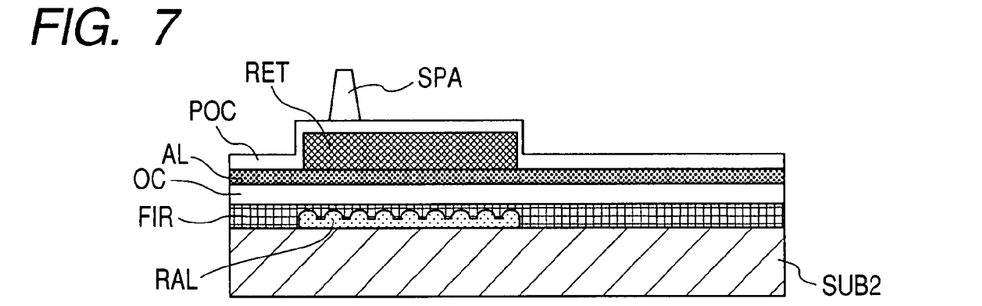
FIG. 7 is a diagram showing a configuration of a variation 5 on the side of the glass substrate (SUB2) shown in FIG. 2A.

FIG. 7 is a diagram showing a configuration of a variation 5 on the side of the glass substrate (SUB2) shown in FIG. 2A. The variation 5 shown in FIG. 7 is a simplified structure applied when the gap adjustment of the reflective element 31 is not required, wherein the gap adjustment layer (MR) is not provided in the structure of the variation 4.

Figure 8:
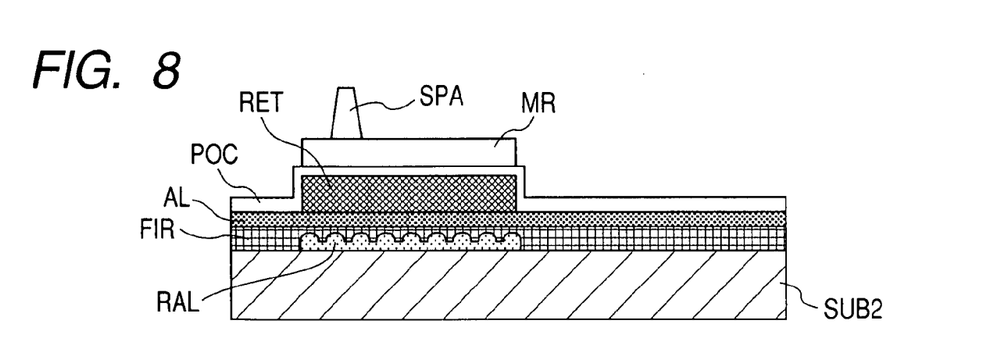
FIG. 8 is a diagram showing a configuration of a variation 6 on the side of the glass substrate (SUB2) shown in FIG. 2A.

FIG. 8 is a diagram showing a configuration of a variation 6 on the side of the glass substrate (SUB2) shown in FIG. 2A. The variation 6 shown in FIG. 8 is a structure for reducing deterioration of process advantages in the variation 4, wherein the planarizing film (OC) is removed from the structure of the variation 4.

If the film surface after forming the color filter (FIR) is flat, the planarizing film (OC) can be removed. The variation 6 thereby makes it possible to reduce the number of processes as well as improve the optical characteristics through a simplified laminated structure.

Figure 9:
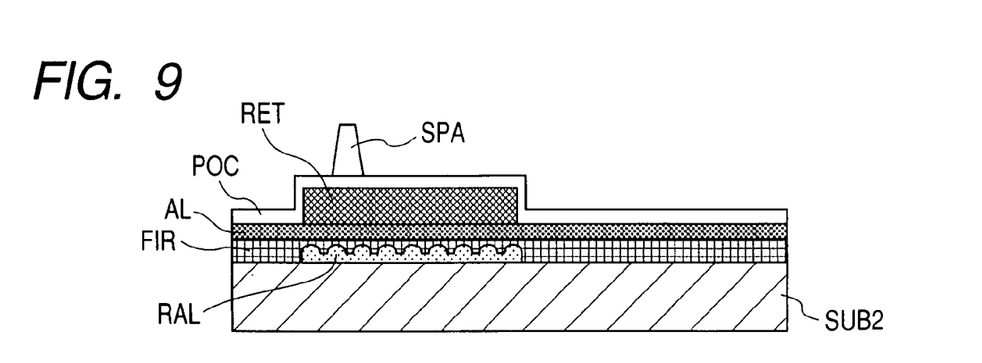
FIG. 9 is a diagram showing a configuration of a variation 7 on the side of the glass substrate (SUB2) shown in FIG. 2A.

FIG. 9 is a diagram showing a configuration of a variation 7 on the side of the glass substrate (SUB2) shown in FIG. 2A. The variation 7 shown in FIG. 9 is a simplified structure applied when the gap adjustment of the reflective element 31 is not required, wherein the gap adjustment layer (MR) is not provided in the structure of the variation 6.

Figure 10:
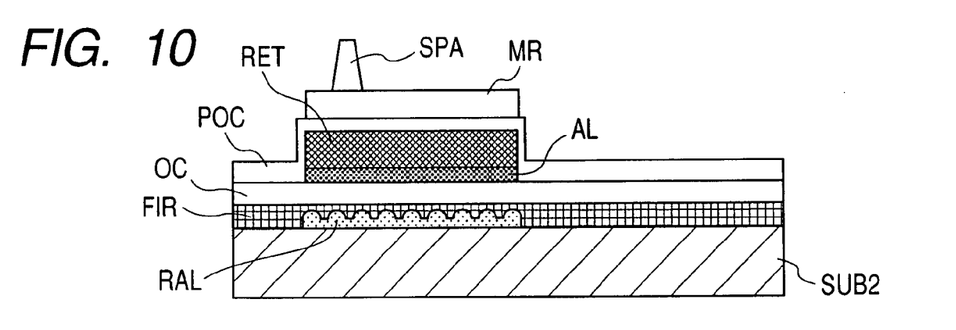
FIG. 10 is a diagram showing a configuration of a variation 8 on the side of the glass substrate (SUB2) shown in FIG. 2A.

FIG. 10 is a diagram showing a configuration of a variation 8 on the side of the glass substrate (SUB2) shown in FIG. 2A. With the variation 8 shown in FIG. 10, the oriented film (AL) is formed only in the reflective element 31 in the structure of the variation 4. The variation 8 thereby makes it possible to improve the transmission characteristics.

Figure 11:
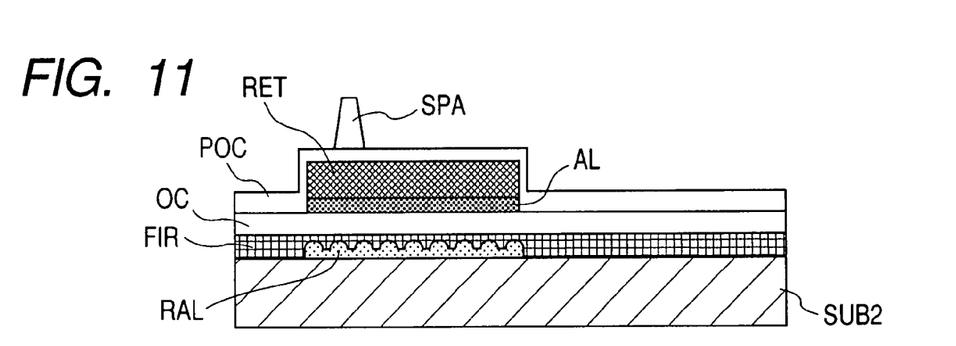
FIG. 11 is a diagram showing a configuration of a variation 9 on the side of the glass substrate (SUB2) shown in FIG. 2A.

FIG. 11 is a diagram showing a configuration of a variation 9 on the side of the glass substrate (SUB2) shown in FIG. 2A. The variation 9 shown in FIG. 11 is a simplified structure applied when the gap adjustment of the reflective element 31 is not required, wherein the gap adjustment layer (MR) is not provided in the structure of the variation 8.

Figure 12:
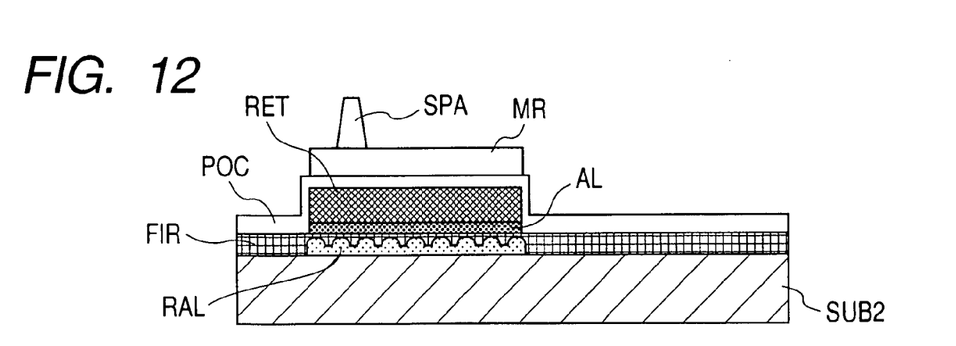
FIG. 12 is a diagram showing a configuration of a variation 10 on the side of the glass substrate (SUB2) shown in FIG. 2A.

FIG. 12 is a diagram showing a configuration of a variation 10 on the side of the glass substrate (SUB2) shown in FIG. 2A. With the variation 10 shown in FIG. 12, the planarizing film (OC) is removed from the structure of the variation 8. The variation 10 thereby makes it possible to reduce the number of processes as well as improve the optical characteristics through a simplified laminated structure.

Figure 13:
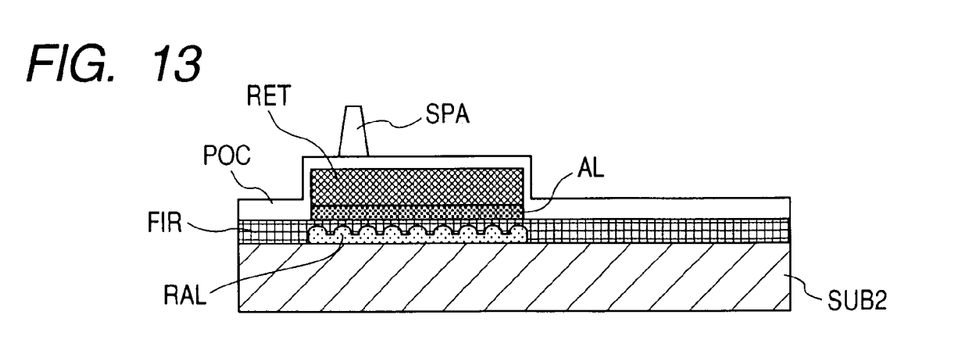
FIG. 13 is a diagram showing a configuration of a variation 11 on the side of the glass substrate (SUB2) shown in FIG. 2A.

FIG. 13 is a diagram showing a configuration of a variation 11 on the side of the glass substrate (SUB2) shown in FIG. 2A. The variation 11 shown in FIG. 13 is a simplified structure applied when the gap adjustment of the reflective element 31 is not required, wherein the gap adjustment layer (MR) is not provided in the structure of the variation 10.

Figure 14:
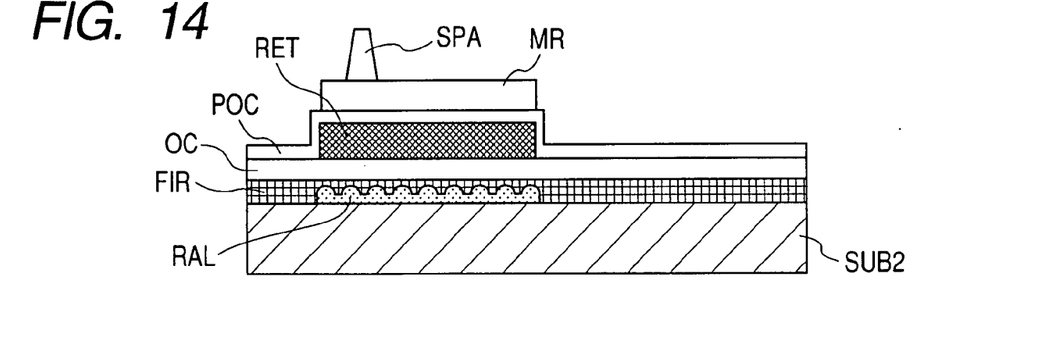
FIG. 14 is a diagram showing a configuration of a variation 12 on the side of the glass substrate (SUB2) shown in FIG. 2A.

FIG. 14 is a diagram showing a configuration of a variation 12 on the side of the glass substrate (SUB2) shown in FIG.

2A. The variation 12 shown in FIG. 14 is a structure for reducing deterioration of process advantages in the variation 4, wherein the need of the oriented film (AL) is eliminated by use of the planarizing film (OC) which can be oriented in the structure of the variation 4. The variation 12 thereby makes it possible to reduce the number of processes as well as improve the characteristics by eliminating the oriented film (AL) which is a coloring factor.

Figure 15:
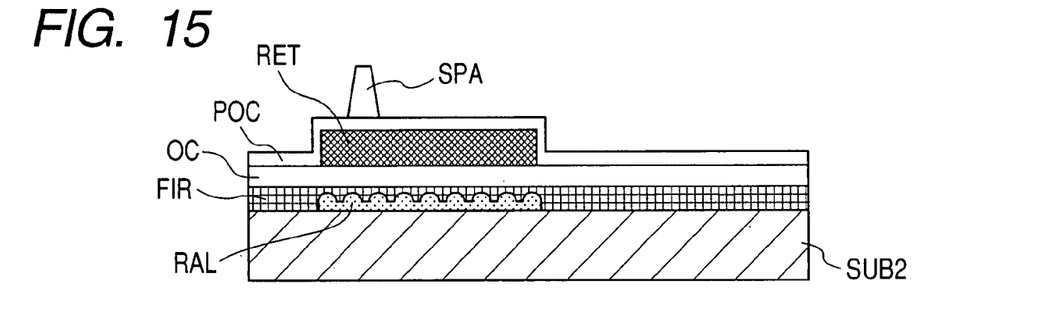
FIG. 15 is a diagram showing a configuration of a variation 13 on the side of the glass substrate (SUB2) shown in FIG. 2A.

FIG. 15 is a diagram showing a configuration of a variation 13 on the side of the glass substrate (SUB2) shown in FIG. 2A. The variation 13 shown in FIG. 15 is a simplified structure applied when the gap adjustment of the reflective element 31 is not required, wherein the gap adjustment layer (MR) is not provided in the structure of the variation 12.

Figure 16:
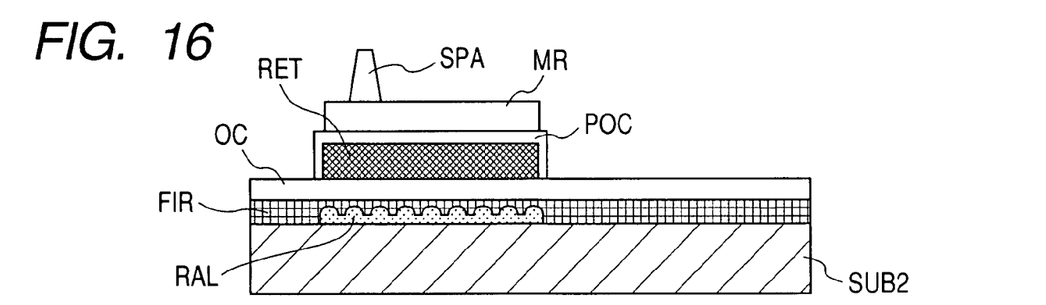
FIG. 16 is a diagram showing a configuration of a variation 14 on the side of the glass substrate (SUB2) shown in FIG. 2A.

FIG. 16 is a diagram showing a configuration of a variation 14 on the side of the glass substrate (SUB2) shown in FIG. 2A. With the variation 14 shown in FIG. 16, the protection film (POC) is formed only in the reflective element 31 which needs to be protected in the structure of the variation 12. The variation 14 thereby makes it possible to reduce number of the laminated structures of the transparent element 30 and expect the improvement in characteristics.

Figure 17:
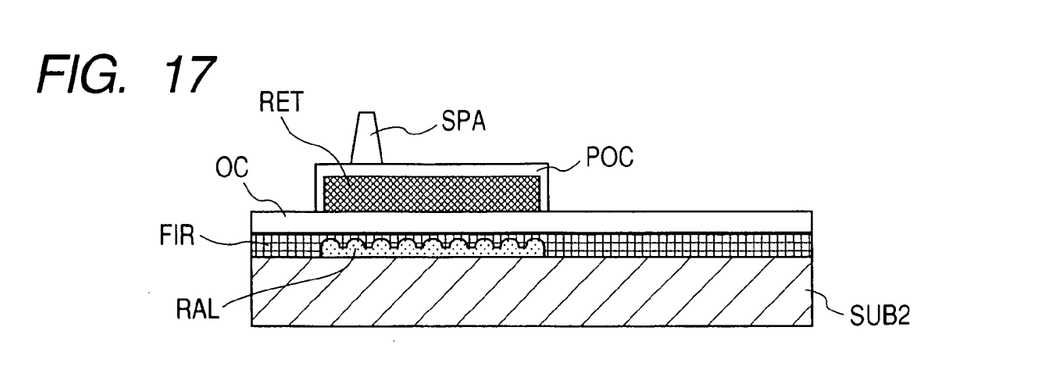
FIG. 17 is a diagram showing a configuration of a variation 15 on the side of the glass substrate (SUB2) shown in FIG. 2A.

FIG. 17 is a diagram showing a configuration of a variation 15 on the side of the glass substrate (SUB2) shown in FIG. 2A. The variation 15 shown in FIG. 17 is a simplified structure applied when the gap adjustment of the reflective element 31 is not required, wherein the gap adjustment layer (MR) is not provided in the structure of the variation 14.

As explained above, in accordance with the present embodiment, it is possible to prevent the degradation of the display characteristics by forming the diffuse reflection layer (RAL) on the side of the glass substrate (SUB2) in a semi-transparent liquid crystal display device wherein the built-in retardation film (RET) is included on the side of the glass substrate (SUB2) and the main surface side of the glass substrate (SUB1) is the observation side.

Furthermore, in accordance with the present embodiment, it is possible to prevent damage to the built-in retardation film (RET) etc. to improve the reliability in a semi-transparent liquid crystal display device wherein the built-in retardation film (RET) is included on the side of the glass substrate (SUB2) and the main surface side of the glass substrate (SUB1) is the observation side.

Although the explanation referred to an embodiment which applied the present invention to an IPS-based semi-transparent liquid crystal display device, the present invention is not limited thereto, but can also be applied to an ECB-based semi-transparent liquid crystal display device or a VA-based semi-transparent liquid crystal display device.

While the invention performed by the present inventor has specifically been explained based on the above-mentioned embodiment, the present invention is not limited to the embodiment but can be modified in diverse ways without departing from the spirit and scope thereof.

What is claimed is:

1. A liquid crystal display device comprising a liquid crystal display panel which includes a pair of substrates and liquid crystal supported between the pair of substrates, wherein
   the liquid crystal display panel includes a plurality of sub-pixels;
   each of the plurality of sub-pixels includes a transparent element and a reflective element;
   one substrate of the pair of substrates includes:
   a diffuse reflection layer formed at a position corresponding to the reflective element of each individual sub-pixel;
   a color filter formed on the diffuse reflection layer;
   an oriented film formed on the color filter;
   a retardation film formed in a region in which the diffuse reflection layer is formed on the oriented film; the region in which the retardation film is formed being separate from the transparent element; and
   a protection film formed on the retardation film,
   wherein the oriented film expands from the reflective element to the transparent element,
   the protection film covers the retardation film and one part of the oriented film, the one part of the oriented film being formed in a region in which the retardation film is not formed, and
   a surface of the other substrate of the pair of substrates on a side opposite to the liquid crystal is a display surface.

2. The liquid crystal display device according to claim 1, including a planarizing film formed on the color filter, wherein
   the oriented film is formed on the planarizing film.

3. The liquid crystal display device according to claim 2, wherein the planarizing film acts also as the oriented film.

4. The liquid crystal display device according to claim 1, including a gap adjustment layer formed on the protection film.

5. The liquid crystal display device according to claim 2, including a gap adjustment layer formed on the protection film.

6. The liquid crystal display device according to claim 2, wherein the retardation film is composed of a polymer liquid crystal material.

7. The liquid crystal display device according to claim 4, wherein a columnar spacer being formed on the gap adjustment layer.

8. The liquid crystal display device according to claim 4, wherein a columnar spacer being formed on the gap adjustment layer.

* * * * *